(12) United States Patent
Lee et al.

(10) Patent No.: US 9,988,515 B2
(45) Date of Patent: Jun. 5, 2018

(54) METHOD FOR PREPARING CONJUGATED DIENE POLYMER, COMPOSITION COMPRISING THE SAME AND TIRE COMPRISING THE COMPOSITION

(71) Applicant: LG CHEM, LTD., Seoul (KR)

(72) Inventors: Ro Mi Lee, Daejeon (KR); Sang Mi Lee, Daejeon (KR); Heung Yeal Choi, Daejeon (KR); Yu Jin Kim, Daejeon (KR); Moon Seok Chun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 92 days.

(21) Appl. No.: 14/394,422

(22) PCT Filed: Mar. 27, 2014

(86) PCT No.: PCT/KR2014/002620
§ 371 (c)(1),
(2) Date: Oct. 14, 2014

(87) PCT Pub. No.: WO2014/175561
PCT Pub. Date: Oct. 30, 2014

(65) Prior Publication Data
US 2015/0376321 A1    Dec. 31, 2015

(30) Foreign Application Priority Data

Apr. 25, 2013 (KR) .................. 10-2013-0045813
Dec. 2, 2013 (KR) .................. 10-2013-0148856

(51) Int. Cl.
| | |
|---|---|
| C08K 3/36 | (2006.01) |
| C08C 19/25 | (2006.01) |
| C08L 9/06 | (2006.01) |
| B60C 1/00 | (2006.01) |
| C08C 19/44 | (2006.01) |
| C08L 15/00 | (2006.01) |

(52) U.S. Cl.
CPC .............. C08K 3/36 (2013.01); B60C 1/00 (2013.01); B60C 1/0016 (2013.01); C08C 19/25 (2013.01); C08C 19/44 (2013.01); C08L 15/00 (2013.01)

(58) Field of Classification Search
CPC .......... C08K 3/36; C08K 5/544; C08C 19/22; C08C 19/25; C08C 19/44; C08L 15/00; C08L 9/06; B60C 1/00; B60C 1/0016
See application file for complete search history.

(56) References Cited

U.S. PATENT DOCUMENTS

| | | | | |
|---|---|---|---|---|
| 6,057,397 | A * | 5/2000 | Takagishi | B60C 1/00 524/492 |
| 2011/0282001 | A1* | 11/2011 | Steinhauser | B60C 1/00 524/575 |
| 2012/0289647 | A1* | 11/2012 | Koelle | B60C 1/0016 524/525 |
| 2014/0187707 | A1* | 7/2014 | Okabe | C08K 3/36 524/526 |

FOREIGN PATENT DOCUMENTS

| | | | |
|---|---|---|---|
| CN | 1599758 | A | 3/2005 |
| CN | 102781968 | A | 11/2012 |
| JP | 2002-322319 | A | 11/2002 |
| JP | 2005-290355 | | 10/2005 |
| JP | 2010-116546 | | 5/2010 |
| JP | 2011-219701 | | 11/2011 |
| JP | 2012-153764 | | 8/2012 |
| KR | 10-2008-0063774 | | 7/2008 |
| KR | 10-2009-0068347 | | 6/2009 |
| KR | 10-2011-0052523 | * | 5/2011 |
| KR | 10-2011-0052523 | A | 5/2011 |
| KR | 10-2012-0139014 | | 12/2012 |
| KR | 10-2012-0139014 | A | 12/2012 |
| WO | 2003/048216 | A1 | 6/2003 |
| WO | 2013035589 | A1 | 3/2013 |

OTHER PUBLICATIONS

KR 10-2011-0052523, May 2011, machine translation.*

* cited by examiner

*Primary Examiner* — Roberto Rabago
(74) *Attorney, Agent, or Firm* — Dentons US LLP

(57) ABSTRACT

Disclosed are a method for preparing a conjugated diene polymer including synthesizing an initiator having an anionic end containing an amine and a cationic end containing an alkali metal, polymerizing a combination of an aromatic vinyl monomer using the initiator to synthesize a polymer having a modified end, coupling or reacting the polymer with a compound having at least one silyl group substituted by an alkoxy group and a nitrogen atom to prepare a modified conjugated diene polymer having one end containing amine and the other end containing silyl group substituted by one or more alkoxy group and a nitrogen atom, and a rubber composition comprising the conjugated diene polymer and silica as a reinforcing agent and thus exhibiting superior heat generation, tensile strength, abrasion resistance and wet skid resistance.

10 Claims, No Drawings

METHOD FOR PREPARING CONJUGATED DIENE POLYMER, COMPOSITION COMPRISING THE SAME AND TIRE COMPRISING THE COMPOSITION

This application is a 35 USC § 371 National Stage entry of International Application No. PCT/KR2014/002620, filed on Mar. 27 2014, and claims priority to Korean Application Nos. 10-2013-0045813, filed on Apr. 25, 2013 and 10-2013-0148856, filed on Dec. 2, 2013, all of which are hereby incorporated by reference in their entireties as if fully set forth herein.

TECHNICAL FIELD

The present invention relates to a method for preparing a conjugated diene polymer, a rubber composition comprising the same and a tire comprising the composition. The present invention relates to a method for preparing a conjugated diene polymer including synthesizing an initiator having an anionic end containing an amine and a cationic end containing an alkali metal, polymerizing a combination of an aromatic vinyl monomer using the initiator to synthesize a polymer having a modified end, coupling or reacting the polymer with a compound having at least one silyl group substituted by an alkoxy group and a nitrogen atom to prepare a modified conjugated diene polymer having one end containing amine and the other end containing silyl group substituted by one or more alkoxy group and a nitrogen atom, and a rubber composition which comprises the conjugated diene polymer and silica as a reinforcing agent and thus exhibits superior heat generation, tensile strength, abrasion resistance and wet skid resistance.

BACKGROUND ART

Social concern about environmental problems such as inhibition of carbon dioxide exhaust is demanded. In response to this demand, there is an increasing demand for development of materials having low rolling resistance and materials having sufficient abrasion resistance and fracture characteristics due to superior wet skid resistance as materials for vehicle tires, in particular, tire treads contacting the road.

Meanwhile, carbon black, silica and the like are used as reinforcements for tire treads. When silica is used as a reinforcement, advantageously, hysteresis loss is reduced or wet skid resistance is improved. As compared to carbon black having a hydrophobic surface, silica having a hydrophilic surface has a disadvantage of low dispersibility in rubber due to low affinity to conjugated diene rubbers. Accordingly, use of an additional silane coupling agent is required to improve dispersiability of silica in rubbers or to form silica-rubber bonds.

In order to solve these problems of silica, functional groups having affinity to or reactivity with silica are introduced into an end of rubber molecules having high mobility to improve dispersiability of silica in conjugated diene rubbers and seal the end of rubber molecules by bonding to silica particles and thereby reduce hysteresis loss.

DISCLOSURE

Technical Problem

Therefore, as a result of extensive research to address the problems of the related art, the present inventors discovered that silica used as a reinforcement provides a rubber composition comprising a diene rubber exhibiting superior heat generation, tensile strength, abrasion resistance and wet skid resistance, and the reinforcing agent. The present invention has been completed based on this discovery.

It is one object of the present invention to provide a method for preparing a modified conjugated diene polymer having at least one silyl group substituted by an alkoxy group and a nitrogen atom, the method comprising coupling or reacting an active polymer having an end modified with an amine with a compound having silyl group substituted by one or more alkoxy group and a nitrogen atom.

It is another object of the present invention to provide a modified conjugated diene polymer prepared by the method described above.

It is yet another object of the present invention to provide a rubber composition comprising the modified conjugated diene polymer.

Technical Solution

In accordance with one aspect of the present invention, the invention provides a method for preparing a modified conjugated diene polymer comprising: a) reacting a compound represented by the following Formula 1 with an organometallic compound to prepare an initiator:

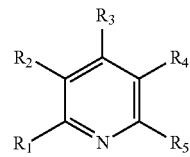

[Formula 1]

wherein $R_1$ to $R_5$ each independently represent hydrogen or a C1-C21 alkyl group with the proviso that at least one of $R_1$ to $R_5$ is a C1-C21 alkyl group;

b) polymerizing a conjugated diene monomer, or the conjugated diene monomer and a comonomer thereof with the initiator to prepare an active polymer; and c) reacting the active polymer with aminosilane to prepare a modified conjugated diene polymer.

In Formula 1, $R_1$ and $R_5$ each independently represent a methyl or ethyl group and $R_2$ to $R_4$ represent hydrogen.

A molar ratio of the compound represented by Formula 1 to the organometallic compound is for example 1:0.001 to 1:5.

A molar ratio of the compound represented by Formula 1 to the aminosilane is for example 1:0.01 to 1:2.

The comonomer of step b) is for example an aromatic vinyl monomer.

The aminosilane of step c) is for example aminotrialkoxysilane.

The aminotrialkoxysilane for example comprises at least one selected from the group consisting of compounds represented by Formulae 2, 3 and 4 below.

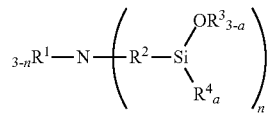

[Formula 2]

wherein R¹ and R² each independently represent a C1-C12 alkyl or alkylsilyl group, R³ and R⁴ represent a C1-C12 alkyl group, a is an integer of 0 to 2, and n is an integer of 1 to 3.

In Formula 2, for example, R¹ represents a C1-C3 or C1-C2 alkyl group, R² represents a C1-C5 or C2-C4 alkylene group, R³ and R⁴ each independently represent a C1-C3 or C1-C2 alkyl group, and n is an integer of 1 or 2.

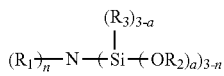

[Formula 3]

wherein $R_1$ represents a C1-C12 alkyl or alkylsilyl group, $R_2$ and $R_3$ each independently represent C1-C12 alkyl group, a is an integer of 1 to 3, and n is an integer of 0 to 2, wherein two $R_1$ bonded to nitrogen are identical or different when n is 2, and similarly, corresponding groups are identical or different when 3−n is 2 or more.

In Formula 3, for example, $R_1$ to $R_3$ represent a C1-C3 or C1-C2 alkyl group and n is an integer of 2 or 3.

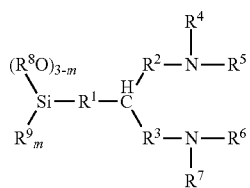

[Formula 4]

wherein R¹, R² and R³ each independently represent a C1-C15 alkylene group, R⁴, R⁵, R⁶, R⁷ and R⁹ each independently represent a C1-C15 alkyl or alkylsilyl group, R⁸ represents a C1-C15 alkyl group, and m is an integer of 0 to 2.

In Formula 4, for example, R⁴ to R⁷ each independently represent a C1-C3 or C1-C2 alkyl group, R² and R³ each independently represent a C1-C3 or C1-C2 alkylene group, R⁸ and R⁹ represent a C1-C3 or C1-C2 alkyl group and m is an integer of 0 or 1.

The aminotrialkoxysilane may for example comprise at least one selected from the group consisting of bis(methyl-dimethoxypropyl)-N-methylamine, tris(trimethoxysilyl)amine and 3-dimethylamino-2((dimethylaminomethyl)propyl)trimethoxysilane.

In accordance with another aspect of the present invention, provided is a modified conjugated diene polymer prepared by the method described above.

In accordance with another aspect of the present invention, provided is a modified conjugated diene polymer represented by the following Formula 5:

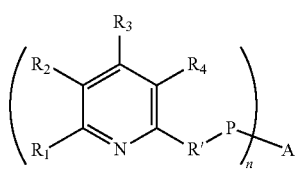

[Formula 5]

wherein $R_1$ represents hydrogen, a C1-C21 alkyl group, or R'-P-A, $R_2$ to $R_4$ each independently represent hydrogen or a C1-C21 alkyl group, R' represents a C1-C21 alkylene group, P represents a conjugated diene polymer chain, A represents an aminosilane group and n is an integer of 1 to 5.

The aminosilane group used herein refers to a remaining group left after removing one to four of atoms or atomic groups bonded to silicon (Si) atoms in aminosilane and the removed atomic group is for example an alkoxy group bonded to silicon.

In Formula 5, for example, $R_1$ to $R_4$ independently represent hydrogen, a methyl group or an ethyl group, and R' represents a methylene group or an ethylene group.

In another example, in Formula 5, $R_1$ represents a methyl group or an ethyl group, R' represents a methylene group or an ethylene group, and $R_2$ to $R_4$ represent hydrogen.

The conjugated diene polymer chain is for example a styrene-butadiene copolymer chain.

The aminosilane group is for example aminotrialkoxysilane.

The modified conjugated diene polymer may for example have a Mooney viscosity of 30 to 90.

The modified conjugated diene polymer may, for example, have an aromatic vinyl monomer content of 5 to 50% by weight.

The modified conjugated diene polymer may, for example, have a vinyl content of 5 to 60% by weight.

The modified conjugated diene polymer may, for example, have a polydispersity index (PDI) of 1.0 to 4.0.

In accordance with another aspect of the present invention, provided is a rubber composition comprising 100 parts by weight of the modified conjugated diene polymer and 1 to 200 parts by weight of a silica-based inorganic filler.

In accordance with yet another aspect of the present invention, provided is a tire comprising the rubber composition.

Advantageous Effects

As apparent from the foregoing, the rubber composition comprising the modified conjugated diene polymer according to the present invention, when mixed with silica as a reinforcement, advantageously, exhibits low fuel consumption and superior tensile strength, abrasion resistance and wet skid resistance.

BEST MODE

The present invention provides a method for preparing a modified conjugated diene polymer comprising: a) reacting a compound represented by the following Formula 1 with an organometallic compound to prepare an initiator:

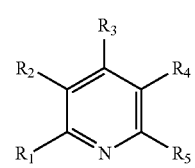

[Formula 1]

wherein $R_1$ to $R_5$ each independently represent hydrogen or a C1-C21 alkyl group with the proviso that at least one of $R_1$ to $R_5$ is a C1-C21 alkyl group;

b) polymerizing a conjugated diene monomer, or the conjugated diene monomer and a comonomer thereof with the initiator to prepare an active polymer; and c) reacting the active polymer with aminosilane to prepare a modified conjugated diene polymer.

For example, the method for preparing the modified conjugated diene polymer comprises: (a) synthesizing an initiator having an anionic end containing amine and a cationic end containing an alkali metal; (b) polymerizing a homopolymer of a conjugated diene monomer or a copolymer of an aromatic vinyl monomer and the conjugated diene monomer in the presence of the initiator to prepare an active polymer having a modified end represented by the following Formula 6; and (c) coupling or reacting the active polymer having an alkali metal end with a compound represented by the following Formulae 2 to 4 to obtain a modified polymer:

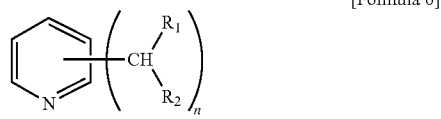

[Formula 6]

wherein $R_1$ and $R_2$ each independently represent hydrogen or a C1-C10 alkyl group, and n is an integer of 2 to 5,

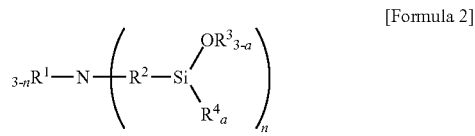

[Formula 2]

wherein $R^1$ and $R^2$ each independently represent a C1-C12 alkyl or alkylsilyl group, $R^3$ and $R^4$ represent a C1-C12 alkyl group, a is an integer of 0 to 2, and n is an integer of 1 to 3.

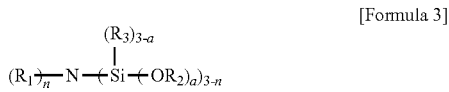

[Formula 3]

wherein $R_1$ represents a C1-C12 alkyl or alkylsilyl group, $R_2$ and $R_3$ each independently represent a C1-C12 alkyl group, a is an integer of 1 to 3, and n is an integer of 0 to 2, wherein two $R_1$ bonded to nitrogen are identical or different when n is 2, and similarly, corresponding groups are identical or different when 3−n is 2 or more.

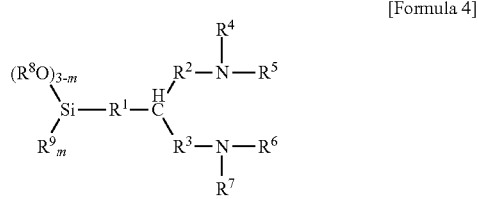

[Formula 4]

wherein $R^1$, $R^2$ and $R^3$ each independently represent a C1-C15 alkylene group, $R^4$, $R^5$, $R^6$, $R^7$ and $R^9$ each independently represent a C1-C15 alkyl or alkylsilyl group, $R^8$ represents a C1-C15 alkyl group, and m is an integer of 0 to 2.

The modified conjugated diene polymer is for example one of two type of polymers represented by the following Formula 7 or a mixture thereof.

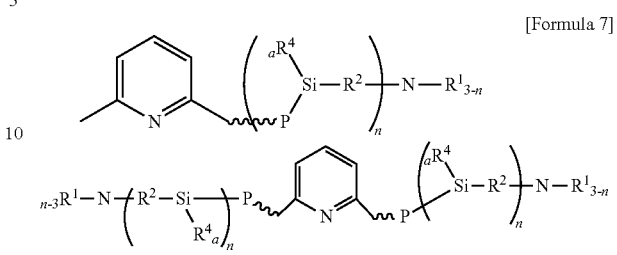

[Formula 7]

wherein $R^1$ and $R^2$ each independently represent C1-C12 alkyl or alkylsilyl group, $R^4$ represents an alkyl group, P represents a conjugated diene polymer, a is an integer of 0 to 2, and n is an integer of 1 to 3.

Synthesis of Initiator

The initiator of step (a) is prepared by reacting a compound (compound represented by Formula 1) providing an anionic end containing amine with a compound (organometallic compound) providing a cationic end containing an alkali metal and the reaction is for example depicted by the following reaction scheme 1:

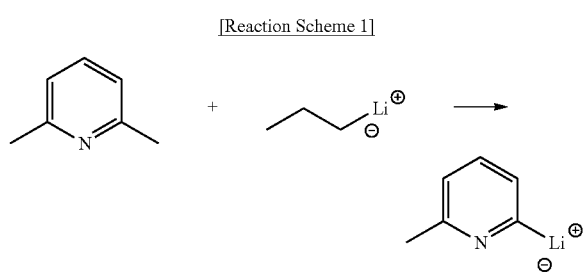

[Reaction Scheme 1]

The initiator, the product as described above, is synthesized by reacting 2,6-dimethylpyridine with n-propyl lithium.

A molar ratio of the compound represented by Formula 1 to the organometallic compound is for example 1:0.001 to 1:5, 1:0.1 to 1:2, or 1:0.4 to 1:1.5. Within this range, there is an effect in that the initiator is easily synthesized.

The cationic end containing an alkali metal is obtained from at least one compound selected from the group consisting of methyl lithium, ethyl lithium, n-propyl lithium, isopropyl lithium, n-butyl lithium, sec-butyl lithium, tert-butyl lithium, n-decyl lithium, tert-octyl lithium, phenyl lithium, 1-naphthyl lithium, n-eicosyl lithium, 4-butylphenyl lithium, 4-tolyl lithium, cyclohexyl lithium, 3,5-di-n-heptylcyclohexyl lithium and 4-cyclopentyl lithium, but the present invention is not limited thereto. Particularly preferred are n-butyl lithium and sec-butyl lithium. These compounds may be used alone or in combination of two or more thereof. Other organic alkali metal compounds include organic sodium compounds, organic potassium compounds, organic rubidium compounds, organic cesium compounds and the like. Specifically, examples of other organic alkali metal compounds include sodium naphthalene, potassium naphthalene and the like. Further, alkoxides, sulfonates, amides and the like of lithium, sodium and potassium may be used. In addition, these compounds may be used in conjunction with other organometallic compounds.

The amine compound may comprise at least one selected from the group consisting of 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2,3,4-trimethylpyridine, 2,4,5-trimethylpyridine, 2,4,6-trimethylpyridine, 2,3,4,5-tetramethylpyridine, 2,3,4,6-tetramethylpyridine, 2,3,5,6-tetramethylpyridine, 2-ethylpyridine, 3-ethylpyridine, 4-ethylpyridine, 2,3-diethylpyridine, 2,4-diethylpyridine, 2,5-diethylpyridine, 2,6-diethylpyridine, 3,4-diethylpyridine, 3,5-diethylpyridine, 2,3,4-triethylpyridine, 2,4,5-triethylpyridine, 2,4,6-triethylpyridine, 2,3,4,5-tetraethylpyridine, 2,3,4,6-tetraethylpyridine, 2,3,5,6-tetraethylpyridine, 2-propylpyridine, 3-propylpyridine, 4-propylpyridine, 2,3-dipropylpyridine, 2,4-dipropylpyridine, 2,5-dipropylpyridine, 2,6-dipropylpyridine, 3,4-dipropylpyridine, 3,5-dipropylpyridine, 2,3,4-tripropylpyridine, 2,4,5-tripropylpyridine, 2,4,6-tripropylpyridine, 2,3,4,5-tetrapropylpyridine, 2,3,4,6-tetrapropylpyridine, and 2,3,5,6-tetrapropylpyridine, but the present invention is not limited thereto.

Modification of One End and Polymerization

The conjugated diene polymer, which is an unmodified form of the modified conjugated diene polymer, is obtained by polymerizing a conjugated diene monomer or copolymerizing the conjugated diene monomer with an aromatic vinyl monomer as a comonomer of the conjugated diene monomer.

Any comonomer may be used without particular limitation so long as it is used in conjunction with the conjugated diene monomer in the art to which the present invention pertains.

The polymerization of the conjugated diene polymer may be carried out by adding a polymerization initiator to a reactor for polymerization of the conjugated diene compound or copolymerization of the conjugated diene compound with the aromatic vinyl compound. In addition, the polymerization of the conjugated diene polymer may be carried out by batch-type polymerization or continuous-type polymerization using one or more reactors connected to one another.

The conjugated diene monomer may comprise at least one selected from the group consisting of 1,3-butadiene, 2,3-dimethyl-1,3-butadiene, piperylene, 3-butyl-1,3-octadiene, isoprene and 2-phenyl-1,3-butadiene. Specifically, the conjugated diene monomer is 1,3-butadiene, but the present invention is not limited thereto.

In addition, the aromatic vinyl monomer may comprise at least one selected from the group consisting of styrene, α-methylstyrene, 3-methylstyrene, 4-methylstyrene, 4-propyl styrene, 1-vinylnaphthalene, 4-cyclohexyl styrene, 4-(p-methylphenyl) styrene and 1-vinyl-5-hexyl naphthalene. Specifically, styrene or α-methylstyrene may be used, but the present invention is not limited thereto.

The polymerization is preferably anionic polymerization and an active end is preferably obtained by growth reaction based on leaving anionic polymerization. Polymerization is performed at an elevated or constant temperature, and the polymerization temperature is preferably −20° C. to 200° C., more preferably 0° C. to 150° C., particularly preferably 10° C. to 120° C.

In addition, a polar solvent may be optionally added to an aprotic solvent to increase the polymerization rate or deform the polymer structure. For example, suitable polar solvents include ether solvents selected from the group consisting of tetrahydrofuran, ditetrahydrofurylpropane, diethyl ether, cyclopentyl ether, dipropyl ether, ethylene dimethyl ether, diethylene glycol, dimethyl ether, tertiary butoxy-ethoxy-ethane, bis(2-dimethylaminoethyl)ether and (dimethylaminoethyl)ethylether, and tert-amines selected from the group consisting of trimethylamine, triethylamine, tripropylamine and tetramethylethylenediamine. Preferred is ditetrahydrofurylpropane, triethylamine or tetramethylethylenediamine.

In addition, commonly, block copolymers may be readily prepared due to difference in reaction rate between the conjugated diene compound and the aromatic vinyl compound of the copolymer. However, addition of the polar solvent may cause an increase in reaction rate of the aromatic vinyl compound having a low reaction rate to convert microstructures, for example, block copolymers, corresponding thereto, into random copolymers. The polar solvent for deforming polymer structures is generally used in an amount of 0.1 to 40 moles, preferably 0.1 to 10 moles, per one mole of the polymerization initiator.

Modification

The modified conjugated diene polymer according to the present invention is obtained by reacting a polymer having an end modified with amine (for example, a compound represented by Formula 1) with a compound (aminosilane) having silyl group substituted by one or more alkoxy group and a nitrogen atom.

A molar ratio of the compound represented by Formula 1 to the aminosilane is, for example, 1:0.01 to 1:2, 1:0.1 to 1:2, or 1:0.1 to 1:1.2. Within this range, modification effect is obtained.

The aminosilane of step c) is, for example, aminotrialkoxysilane.

The aminotrialkoxysilane may, for example, comprise at least one selected from the group consisting of compounds represented by the following Formulae 2, 3 and 4:

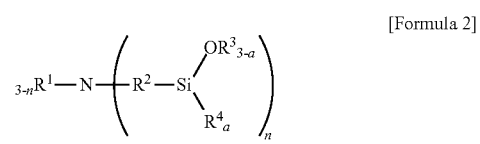
[Formula 2]

wherein $R^1$ and $R^2$ each independently represent a C1-C12 alkyl or alkylsilyl group, $R^3$ and $R^4$ represent a C1-C12 alkyl group, a is an integer of 0 to 2, and n is an integer of 1 to 3,

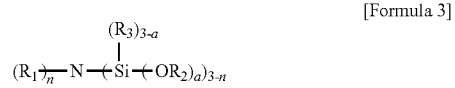
[Formula 3]

wherein $R_1$ represents a C1-C12 alkyl or alkylsilyl group, $R_2$ and $R_3$ each independently represent C1-C12 alkyl group, a is an integer of 1 to 3, and n is an integer of 0 to 2, wherein two $R_1$ bonded to nitrogen are identical or different when n is 2, and similarly, corresponding groups are identical or different when 3−n is 2 or more,

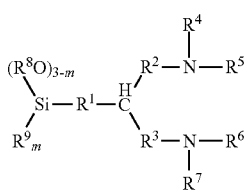

[Formula 4]

wherein $R^1$, $R^2$ and $R^3$ each independently represent a C1-C15 alkylene group, $R^4$, $R^5$, $R^6$, $R^7$ and $R^9$ each independently represent a C1-C15 alkyl or alkylsilyl group, $R^8$ represents a C1-C15 alkyl group, and m is an integer of 0 to 2.

The compound represented by Formula 2 is for example bis(methyldimethoxysilylpropyl)-N-methylamine, bis(methyldiethoxysilylpropyl)-N-methylamine, bis(methyldipropoxysilylpropyl)-N-methylamine, bis(ethyldimethoxysilylpropyl)-N-methylamine, bis(ethyldiethoxysilylpropyl)-N-methylamine, bis(ethyldipropoxysilylpropyl)-N-methylamine, bis(methyldimethoxysilylpropyl)-N-ethylamine, bis(methyldiethoxysilylpropyl)-N-ethylamine, bis(methyldipropoxysilylpropyl)-N-ethylamine, bis(ethyldimethoxysilylpropyl)-N-ethylamine, bis(ethyldiethoxysilylpropyl)-N-ethylamine, bis(ethyldipropoxysilylpropyl)-N-ethylamine, bis(methyldimethoxysilylpropyl)-N-propylamine, bis(methyldiethoxysilylpropyl)-N-propylamine, bis(methyldipropoxysilylpropyl)-N-propylamine, bis(ethyldimethoxysilylpropyl)-N-propylamine, bis(ethyldiethoxysilylpropyl)-N-propylamine, bis(ethyldipropoxysilylpropyl)-N-propylamine, bis(trimethoxysilylpropyl)-N-methylamine, bis(triethoxysilylpropyl)-N-methylamine, bis(tripropoxysilylpropyl)-N-methylamine, trimethoxysilylpropyl-N-methylamine, triethoxysilylpropyl-N-methylamine, tripropoxysilylpropyl-N-methylamine, trimethoxysilylpropyl-N-ethylamine, triethoxysilylpropyl-N-ethylamine, tripropoxysilylpropyl-N-ethylamine, trimethoxysilylpropyl-N-propylamine, triethoxysilylpropyl-N-propylamine or tripropoxysilylpropyl-N-propylamine.

The compound represented by Formula 3 is for example tris(trimethoxysilyl)amine, tris(triethoxysilyl)amine or tris(tripropoxysilyl)amine.

The compound represented by Formula 4 is for example 3-dimethylamino-2(dimethylaminomethyl)propyl) trimethoxysilane, 3-dimethylamino-2((dimethylaminomethyl)propyl)triethoxysilane, 3-dimethylamino-2((dimethylaminomethyl)propyl)tripropoxysilane, 3-diethylamino-2 ((dimethylaminomethyl)propyl)trimethoxysilane, 3-diethylamino-2((dimethylaminomethyl)propyl)triethoxysilane, 3-diethylamino-2((dimethylaminomethyl)propyl) tripropoxysilane, 3-dipropylamino-2((dimethylaminomethyl)propyl)trimethoxysilane, 3-dipropylamino-2 ((dimethylaminomethyl)propyl)triethoxysilane, or 3-dipropylamino-2((dimethylaminomethyl)propyl) tripropoxysilane.

The modified conjugated diene polymer according to the present invention is prepared by the method described above.

The modified conjugated diene polymer may for example have a Mooney viscosity of 20 to 90, 40 to 90, or 50 to 90.

The modified conjugated diene polymer may for example have a weight average molecular weight of 10,000 to 2,000,000 g/mol, 100,000 to 1,800,000 g/mol, or 400,000 to 1,700,000 g/mol.

The modified conjugated diene polymer may for example have a polydispersity index (PDI) of 1.0 to 5.0, or 1.1 to 3.0.

The modified conjugated diene polymer is for example represented by the following Formula 5:

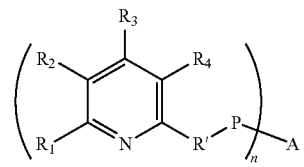

[Formula 5]

wherein $R_1$ represents hydrogen, a C1-C21 alkyl group, or R'-P-A, $R_2$ to $R_4$ each independently represent hydrogen or a C1-C21 alkyl group, R' represents a C1-C21 alkylene group, P represents a conjugated diene polymer chain, A represents an aminosilane group and n is an integer of 1 to 3.

For example, the reaction between the active polymer according to the present invention and aminosilane is depicted by the following Reaction Scheme 2:

[Reaction Scheme 2]

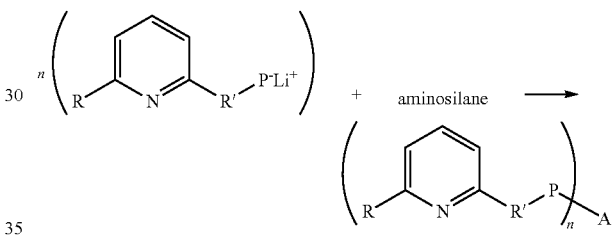

The modified polymer obtained in the present invention may for example be the same as the compound of the following Formula 3.

A reaction temperature and time at which the aminosilane reacts with the active polymer end of the conjugated diene polymer are not particularly limited and the reaction is carried out at a temperature of 0 to 90° C. for one minute to 5 hours.

In addition, the present invention provides a rubber composition comprising 100 parts by weight of a rubber comprising 0.1 to 100% by weight of the modified conjugated diene polymer and 0.1 to 150 parts by weight of a silica-based inorganic filler.

In addition, the present invention provides an molded article, in particular, a tire, comprising the rubber composition.

Hereinafter, preferred examples will be provided for better understanding of the present invention. It will be apparent to those skilled in the art that these examples are only provided to illustrate the present invention and various modifications and alterations are possible within the scope and technical spirit of the present invention. Such modifications and alterations fall within the scope of claims included herein.

EXAMPLE

Example 1

1) Preparation of Modified Polymerization Initiator

Lutidine (2,6-dimethylpyridine, 0.33 g, 0.3 mmol), N,N, N',N'-tetramethylethylene diamine (1.06 g 0.9 mmol) and 16.5 ml of hexane were dissolved in a 250 ml round bottom flask and 2.5M n-butyl lithium (1.52 ml, 0.4 mmol) was added to the resulting solution. At this time, the solution had an anionic group, and thus became clear and turned transparent red. The polymerization initiator was stirred for one hour to prepare 2,6-dimethylpyridine (lutidine)-modified n-butyl lithium.

2) Preparation of SBR (Styrene-Butadiene Rubber)

200 g of styrene, 600 g of 1,3-butadiene and 3,200 g of n-hexane were added to a 10L reactor, followed by heating under stirring to adjust the interior temperature of the reactor to 60° C. After the temperature reached 60° C., the prepared modified polymerization initiator was added to the reactor and adiabatic heating was then performed. After the adiabatic heating, the temperature was adjusted to 70° C. About 20 minutes after the adiabatic heating, 20 g of 1,3-butadiene was added to the reactor.

After 5 minutes, 5 mmol of bis(methyldimethoxysilylpropyl)-N-methylamine was added as aminosilane and reaction was performed for 15 minutes. Then, polymerization was terminated with ethanol and 5 ml of a 0.3 wt % solution of butylated hydroxytoluene (BHT) as an antioxidant in hexane was then added to the reaction mixture.

The polymerization product was stirred in warm water heated by steam to remove the solvent, and the resulting solution was then roll-dried to remove the residual solvent and water, thereby preparing a modified conjugated diene polymer. Analysis results of the modified conjugated diene polymer thus prepared are shown in the following Table 1.

Example 2

A modified conjugated diene polymer was prepared in the same manner as in Example 1, except that tris(trimethoxysilyl)amine was used as aminosilane for preparation of SBR. Analysis results of the modified conjugated diene polymer are shown in the following Table 1.

Example 3

A modified conjugated diene polymer was prepared in the same manner as in Example 1, except that 3-dimethylamino-2-((dimethylaminomethyl)propyl)trimethoxysilane was used as aminosilane for preparation of SBR. Analysis results of the modified conjugated diene polymer are shown in the following Table 1.

Examples 4 to 6

A modified conjugated diene polymer was prepared in the same manner as in Example 1, except that the aminosilane shown in the following Table 2 was used as aminosilane for preparation of SBR. Analysis results of the modified conjugated diene polymer are shown in the following Table 2.

Comparative Example 1

A modified conjugated diene polymer was prepared in the same manner as in Example 1, except that aminosilane was not used for preparation of SBR. Analysis results of the modified conjugated diene polymer are shown in the following Table 1.

Comparative Example 2

A modified conjugated diene polymer was prepared in the same manner as in Example 1, except that a modified initiator was not used, only 4 mol of N-butyl lithium was used and aminosilane was not used. Analysis results of the modified conjugated diene polymer are shown in the following Table 1.

Comparative Example 3

A modified conjugated diene polymer was prepared in the same manner as in Example 1, except that a modified initiator was not used and 4 mol of N-butyl lithium was used. Analysis results of the modified conjugated diene polymer are shown in the following Table 1.

a) Mooney viscosity: measured at 100° C. for 4 minutes using MV-2000 produced by ALPHA Technologies and two specimens having a weight of 15 g or more after pre-heating for one minute.

b) Styrene monomer (SM) and vinyl contents (Vinyl): measured by NMR.

C) Weight average molecular weight (Mw), number average molecular weight (Mn) and polydispersity index (PDI): measured using analysis results of GPC at 40° C. The column used herein was a combination of two PLgel Olexis columns produced by Polymer Laboratories and one PLgel mixed-C column. All newly replaced columns were mixed bed-type columns. In addition, polystyrene (PS) was used as a GPC standard material for determination of molecular weight.

TABLE 1

| Items | | Example 1 | Example 2 | Example 3 | Comparative Example 1 | Comparative Example 2 | Comparative Example 3 |
|---|---|---|---|---|---|---|---|
| Initiator | | Modified initiator: lutidine(2,6-dimethylpyridine) + n-butyl lithium | | | n-butyl lithium | | |
| Modifying agent | | a | b | c | — | — | a |
| Mooney viscosity | | 58 | 57 | 56 | 56 | 58 | 59 |
| Tg (° C.) | | −27 | −29 | −29 | −28 | −30 | −30 |
| Styrene (%) | | 26 | 27 | 27 | 25 | 26 | 26 |
| Vinyl (%) | | 39 | 39 | 39 | 40 | 41 | 40 |
| GPC (×10$^4$) | Mn | 28.7 | 29.9 | 29.9 | 26.0 | 27.9 | 29.3 |
| | Mw | 41.1 | 45.5 | 44.8 | 32.5 | 31.2 | 38.8 |
| | PDI | 1.43 | 1.52 | 1.50 | 1.25 | 1.12 | 1.33 | a: bis(3-dimethoxymethylsilylpropyl)-N-methylamine
b: tris(trimethoxysilyl)amine
c: 3-dimethylamino-2-((dimethylaminomethyl)propyl)trimethoxysilane
PDI: polydispersity

TABLE 2

| Items | Example 4 | Example 5 | Example 6 |
|---|---|---|---|
| Initiator | Modified initiator: lutidine (2,6-dimethylpyridine) + n-butyl lithium | | |
| Modifying agent | a-2 | b-2 | c-2 |
| Mooney viscosity | 55 | 54 | 52 |
| Tg (° C.) | −27 | −29 | −29 |
| Styrene (%) | 27 | 27 | 27 |
| Vinyl (%) | 40 | 41 | 40 |
| GPC (×10$^4$) Mn | 26.5 | 27.5 | 25.4 |
| Mw | 39.9 | 42.4 | 38.4 |
| PDI | 1.51 | 1.54 | 1.51 | a-2: bis(3-diethoxymethylsilylpropyl)-N-methylamine
b-2: tris(triethoxysilyl)amine
c-2: 3-dimethylamino-2-((dimethylaminomethyl)propyl)triethoxysilane Test Example Samples (rubbers) of Examples 1 to 6 and Comparative Examples 1 to 3 were mixed according to the mixing method (ingredients and contents) shown in the following Table 3 to prepare rubber compositions.

TABLE 3

| (Unit: parts by weight) | S-1 |
|---|---|
| Rubber | 100.0 |
| Silica | 70.0 |
| Coupling agent | 11.02 |
| Oil | 37.5 |
| Zinc oxide | 3.0 |
| Stearic acid | 2.0 |
| Antioxidant | 2.0 |
| Anti-aging agent | 2.0 |
| Wax | 1.0 |
| Rubber accelerator | 1.75 |
| Sulfur | 1.5 |
| Vulcanization accelerator | 2.0 |
| Total weight | 233.77 |

Specifically, regarding kneading, the rubber compositions were kneaded using a Banbury mixer equipped with a temperature controller. In primary kneading, a rubber raw material, fillers (silica and carbon black), an organosilane coupling agent, an oil, zinc oxide, a stearic acid antioxidant, an anti-aging agent, a wax and accelerators were primarily kneaded.

At this time, the temperature of the kneader was controlled and a primary mixture was obtained at a discharge temperature of 140 to 150° C.

In secondary kneading, after the primary mixture was cooled to room temperature, a rubber, sulfur and a vulcanization accelerator were added to the kneader and a composition was obtained at a discharge temperature of 45 to 60° C.

In tertiary kneading, the composition was molded and was vulcanized using a vulcanization press at 180° C. for T90+10 minutes to prepare a vulcanized rubber. Physical properties of the prepared vulcanized rubber were measured in accordance with the following method.

1) Tensile Strength Test

Tensile strength at break and tensile stress at an elongation of 300% (300% modulus) of specimens were measured by tensile strength testing in accordance with ASTM 412.

2) Viscoelasticity

A dynamic mechanical analyzer produced by TA Instruments was used. Tan δ was measured while changing strain in a torsional mode at a frequency of 10 Hz and at different measurement temperatures of 0 to 60° C. Payne effect was represented as a difference between a minimum and a maximum at a strain of 0.2% to 40%. As Payne effect decreases, dispersibility of a filler such as silica is improved. As Tan δ at a low temperature of 0° C. increases, wet skid resistance is improved, and as Tan δ at a high temperature of 60° C. decreases, hysteresis loss decreases, and rolling resistance of tires decreases, that is, fuel consumption thereof is reduced.

TABLE 4

| Items | Example 7 | Example 8 | Example 9 | Comparative Example 4 | Comparative Example 5 | Comparative Example 6 |
|---|---|---|---|---|---|---|
| Samples | Example 1 | Example 2 | Example 3 | Comparative Example 1 | Comparative Example 2 | Comparative Example 3 |
| 300% modulus (Kgf/cm$^2$) | 131 | 128 | 133 | 125 | 104 | 123 |
| Tensile strength (Kgf/cm$^2$) | 189 | 192 | 191 | 183 | 168 | 184 |
| Tan δ at 0° C. | 0.990 | 0.988 | 0.991 | 0.635 | 0.542 | 0.986 |
| Tan δ at 60° C. | 0.068 | 0.070 | 0.067 | 0.087 | 0.098 | 0.075 |
| ΔG' at 60° C. (Payne effect) | 0.33 | 0.33 | 0.32 | 0.53 | 0.74 | 0.34 |

TABLE 5

| | Items | | |
|---|---|---|---|
| | Example 10 | Example 11 | Example 12 |
| Samples | Example 4 | Example 5 | Example 6 |
| 300% modulus (Kgf/cm$^2$) | 129 | 128 | 124 |
| Tensile strength (Kgf/cm$^2$) | 185 | 187 | 182 |
| Tan δ at 0° C. | 0.988 | 0.986 | 0.981 |
| Tan δ at 60° C. | 0.070 | 0.073 | 0.069 |

TABLE 5-continued

| | Items | | |
|---|---|---|---|
| | Example 10 | Example 11 | Example 12 |
| ΔG' at 60° C. (Payne effect) | 0.34 | 0.33 | 0.33 |

As can be seen from Tables 4 and 5 above, the rubber compositions (Examples 7 to 12) comprising the modified conjugated diene polymer according to the present invention exhibited tensile stress (300% modulus), tensile strength, skid resistance (improves as Tan δ at 0° C. increases) and fuel consumption reduction (improves as Tan δ at 60° C. decreases), as compared to rubber compositions (Comparative Examples 4 to 6) comprising modified conjugated diene polymers having an end unmodified with a pyridine compound or aminosilane.

What is claimed is:

1. A modified conjugated diene polymer represented by the following Formula 5:

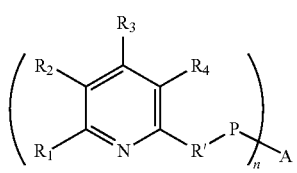

[Formula 5]

wherein in Formula 5: $R_1$ represents hydrogen, a C1-C21 alkyl group, or R'-P-A, $R_2$ to $R_4$ each independently represent hydrogen or a C1-C21 alkyl group, R' represents a C1-C21 alkylene group, P represents a conjugated diene polymer chain, n is an integer of 1 to 5, and A is an aminosilyl group obtained from an aminosilane selected from the group consisting of tris(trimethoxysilyl)amine and 3-dimethylamino-2-((dimethylaminomethyl)propyl)trimethoxysilane by removing one to four atoms or atomic groups bonded to silicon (Si) atoms of the aminosilane.

2. The modified conjugated diene polymer according to claim 1, wherein $R^1$ to $R^4$ of Formula 5 each independently represent hydrogen, a methyl group or an ethyl group and R' of Formula 5 represents a methylene group or an ethylene group.

3. The modified conjugated diene polymer according to claim 1, wherein the conjugated diene polymer chain is a styrene-butadiene copolymer chain.

4. The modified conjugated diene polymer according to claim 1, wherein the modified conjugated diene polymer has a Mooney viscosity of 30 to 90.

5. The modified conjugated diene polymer according to claim 1, wherein the modified conjugated diene polymer has an aromatic vinyl monomer content of 5 to 50% by weight.

6. The modified conjugated diene polymer according to claim 1, wherein the modified conjugated diene polymer has a vinyl content of 5 to 60% by weight.

7. The modified conjugated diene polymer according to claim 1, wherein the modified conjugated diene polymer has a polydispersity index (PDI) of 1.0 to 4.0.

8. A rubber composition comprising:
100 parts by weight of a rubber component comprising 0.1 to 100% by weight of the modified conjugated diene polymer according to claims 1; and
0.1 to 150 parts by weight of a silica inorganic filler.

9. A molded article comprising the rubber composition according to claim 8.

10. The molded article according to claim 9, wherein the article is a tire.

* * * * *